2 Sheets—Sheet 1
B. REGAN.
GRAIN DRILL.
No. 46,821.             Patented Mar. 14, 1865.
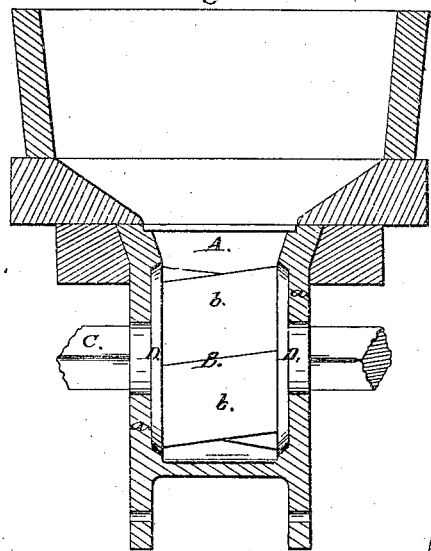
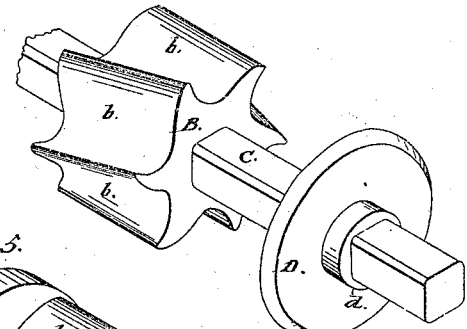
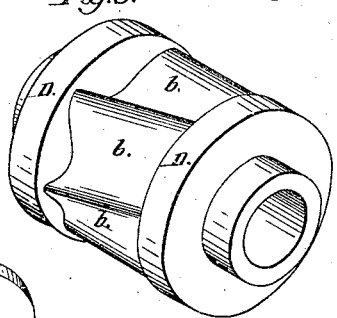
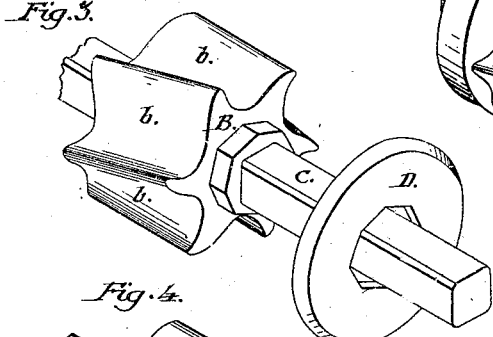
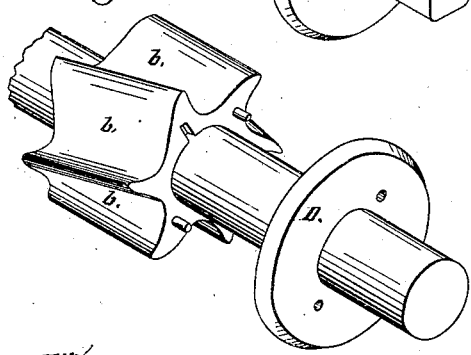
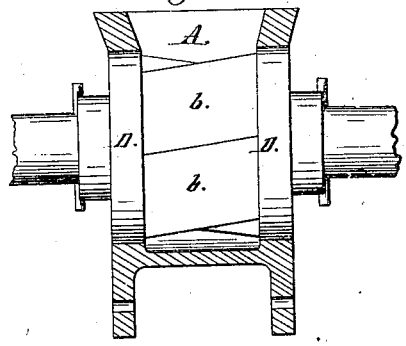
Witnesses:
James H. Layman
W. H. Mackay
Inventor:
B. Regan
by Knight Bros
Attys B. REGAN.
GRAIN DRILL.
No 46,821. Patented Mar. 14, 1865.
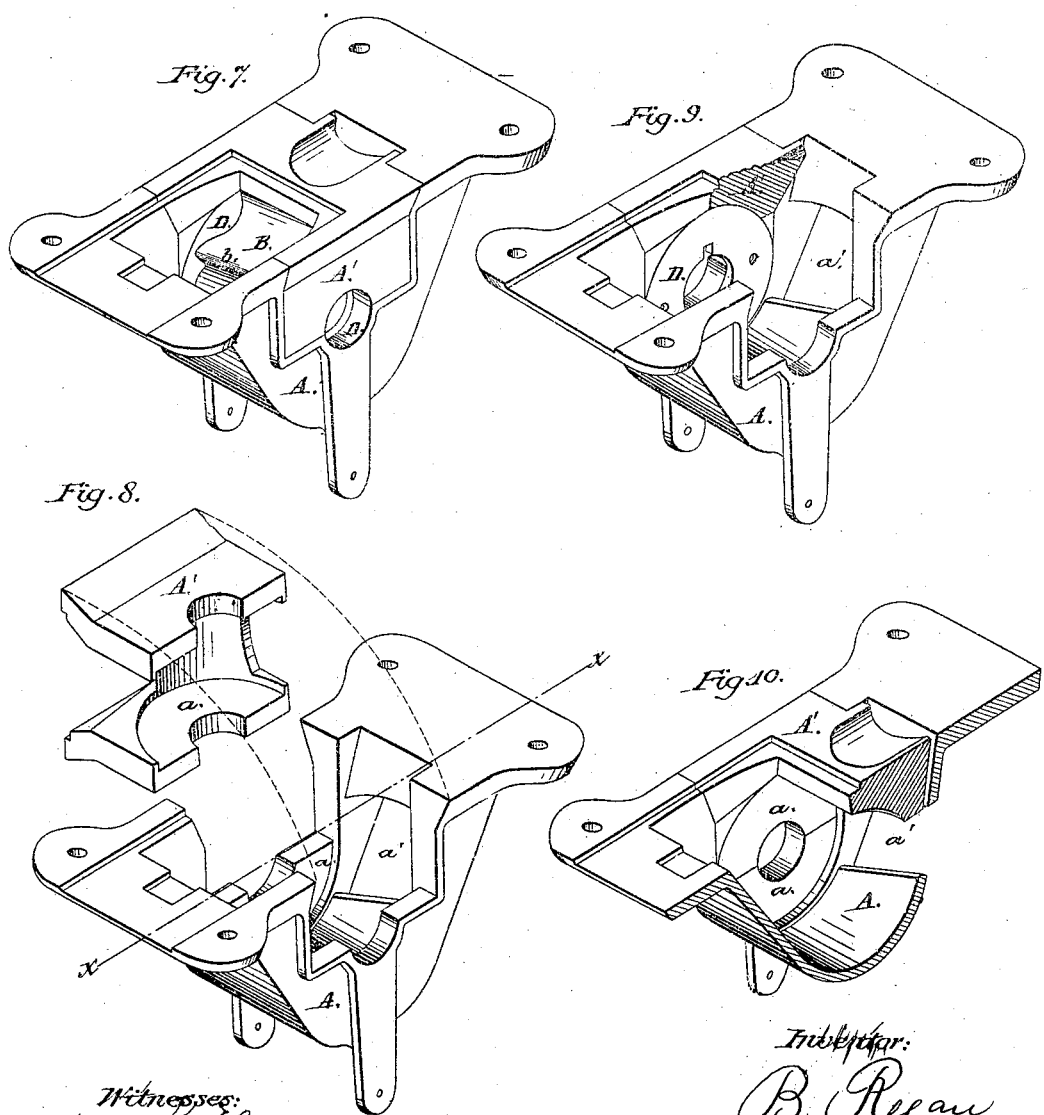

UNITED STATES PATENT OFFICE.

BERNARD REGAN, OF MIAMISBURG, OHIO.

IMPROVEMENT IN GRAIN-DRILLS.

Specification forming part of Letters Patent No. 46,821, dated March 14, 1865.

*To all whom it may concern:*

Be it known that I, BERNARD REGAN, of Miamisburg, Montgomery county, Ohio, have invented a new and useful Improvement in Grain-Drills; and I do hereby declare the following to be a full, clear, and exact description thereof, reference being had to the accompanying drawings, making part of this specification.

My improvement relates to the class of seed-delivering apparatus of grain-drills which contains a rotary feeder armed with teeth or blades and working in a seed box or "cup;" and the object of my invention is to prevent the cutting and crushing of kernels of grain between the feeder and the ends or the bottom of the seed-box.

Figure 1 is an axial section through a seed-delivering apparatus which embodies my improvement. Fig. 2 shows the feeder detached. Figs. 3, 4, and 5 are perspective views, and Fig. 6 is an axial section, showing modifications of my improvement. Fig. 7 is a perspective view of my seed-box and saddle, the feeder and washers being seen in position. Fig. 8 shows the seed-box and saddle detached. Fig. 9 shows the seed-box and a portion of the saddle and one of the washers in position. Fig. 10 is a sectional perspective of the seed-box, taken at the line $x\ x$, Fig. 8.

A is the seed box or cup, converging toward a rounded bottom, so as to snugly inclose the ends and lower part of the periphery of a rotary feeder or wallower, B, whose blades or teeth $b$ serve to agitate the seed and to discharge it through the ventage $a'$. The feeder B is mounted upon and revolves with a shaft, C, which may be a feathered cylinder, as in Fig. 1, or secured by a cotter, as in Fig. 6; or it may have a square or other polygonal section, as in Figs. 1, 2, and 3, in which case it may consist of such rods of iron as may be found ready-made in the stores; nor need the shaft be in one piece, provided the ends meet inside of a feeder, which thus becomes a clutch box or coupling.

In order to prevent the kernels being caught between the feeder and the ends or bottom of the seed-box, by which so much grain is crushed and destroyed in seeding apparatus of this class, I provide conical, cylindrical, or other smooth and circular washers or collars D, which collars are made to revolve with the shaft and feeder, and occupy circular cavities or recesses $a$ in the inner surfaces of the ends of the seed-box, the said cavities corresponding in depth with the thickness of the said collars, so as to bring the sides of the collars next the feeder flush with the said inner surfaces of the box ends.

The seed-box may be formed in one piece, as represented in Fig. 1; but a preferable mode of construction is that represented in Figs. 7, 8, 9, and 10. A being the cup, and A' being a saddle. When the form represented in Fig. 7 is employed one half of the cavity for the collar is formed in the cup and the other half in the saddle.

A seed-box thus constructed can at any time be detached from the hopper for inspection or repair without withdrawing the shaft C. The collars, being thus let in or recessed, so as to bring their flat surfaces flush with those of the cup and saddle, become, in effect, revolving ends to the seed-box.

I have selected to illustrate my invention a form preferred by me on account of its simplicity and effectiveness in actual use, but do not desire to restrict the invention to the above so long as the same results are attained by means substantially equivalent. For example, an octagonal or other prismatic boss upon the feeder may enter a corresponding aperture in the collar, (see Fig. 3;) or small studs and teats entering holes in the collar may in like manner secure its co-rotation with the feeder, as in Fig. 4; or the collars may be cast in one piece with the feeder, as in Fig. 5, and these collars may even come through to the outside of the box, as in Fig. 6.

The essential features of my improvement are that the collars shall be entirely circular—that is, free from notches or other indentations—that they shall revolve with the feeder, and that they shall be substantially flush with the interior end surfaces of the box.

I am aware that cogged feed-wheels have been proposed having indented or scalloped washers which revolve between the feed-wheel and the box side, but in such a manner that the peripheries of the washers have been exposed within the box or cup, and have been liable to catch and crush the kernels between the said peripheries and the cup-bottom, and I therefore make no claim to such; nor do I claim collars formed with notched or scalloped margins, so as to constitute a part of the feeding mechanism; but

What I claim herein as new and of my invention, and desire to secure by Letters Patent, is—

The provision in the seed-box of a scalloped or winged feed-wheel B, having collars D D, occupying recesses $a$ in the ends of the seed-box, so as to be flush with the inner surfaces thereof, substantially as and for the purpose set forth.

In testimony of which invention I hereunto set my hand.

BERNARD REGAN.

Witnesses:
 GEO. H. KNIGHT,
 JAMES H. LAYMAN.